United States Patent [19]

Kuribayashi et al.

[11] Patent Number: 4,855,148

[45] Date of Patent: Aug. 8, 1989

[54] METHOD FOR PRODUCING QUASI-NATURAL CHEESE FERMENTED FOODS

[75] Inventors: Yoshihiro Kuribayashi, Usuki; Kazuomi Sueoka, Nagasaki, both of Japan

[73] Assignee: Fundokin Shoyu Kabushiki Kaisha, Oita, Japan

[21] Appl. No.: 187,250

[22] Filed: Apr. 28, 1988

[30] Foreign Application Priority Data

Apr. 30, 1987 [JP] Japan ................................ 62-104590

[51] Int. Cl.$^4$ .......................... A23L 1/20; A23C 20/02
[52] U.S. Cl. ........................................ 426/46; 426/38; 426/61; 426/62; 426/573; 426/634; 426/582
[58] Field of Search ................. 426/7, 46, 52, 62, 573, 426/634, 582, 38, 61

[56] References Cited

U.S. PATENT DOCUMENTS

| | | | |
|---|---|---|---|
| Re. 28,810 | 5/1976 | Tsumura et al. | 426/46 |
| 3,857,970 | 12/1974 | Tsumura et al. | 426/46 |
| 3,982,025 | 9/1976 | Hashimoto et al. | 426/46 |
| 4,080,477 | 3/1978 | Tsumura et al. | 426/46 |

*Primary Examiner*—Marianne Cintins
*Attorney, Agent, or Firm*—Birch, Stewart, Kolasch & Birch

[57] ABSTRACT

A method for making a quasi-natural cheese fermented food from curds obtained by the lactic fermentation of soybean milk, comprising the steps of: (i) shaping the curds treated in a conventional cheese-making manner to a solid form by compacting and pressing, thereby fixing said curds, and (ii) subjecting the thus fixed curds to fermentative ripening in a brewing material containing at least one type of koji as the substrate to which lactic acid bacteria and/or yeast are added.

13 Claims, 1 Drawing Sheet

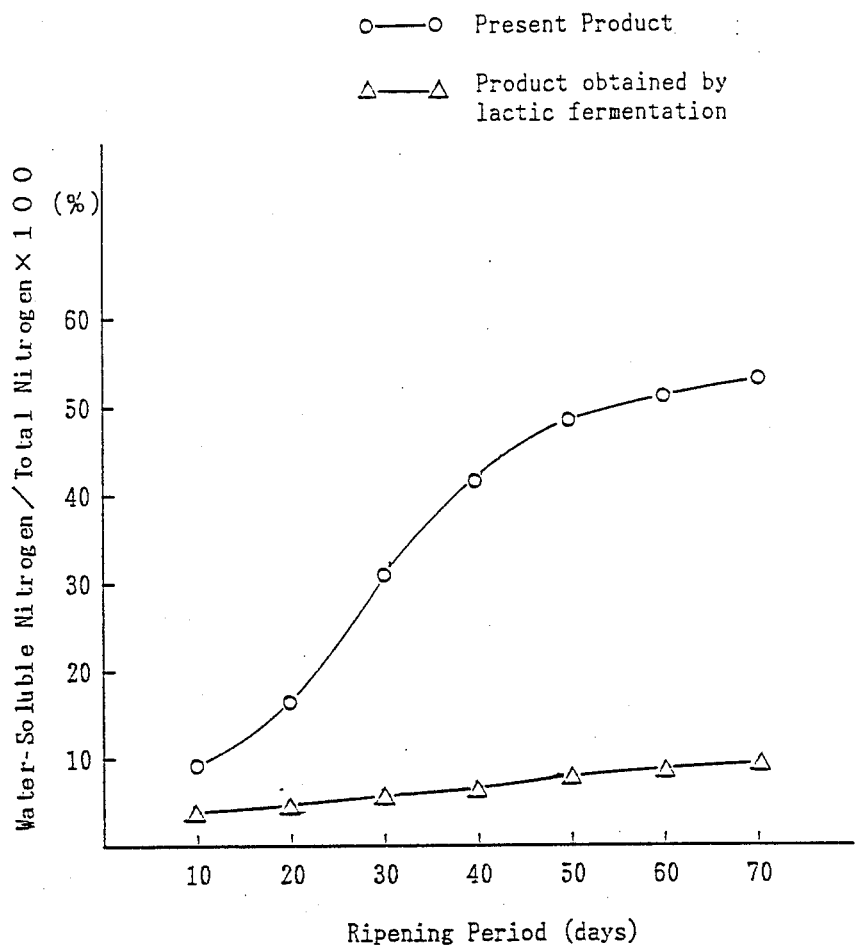
Fig. 1 Rate of Curd Protein

METHOD FOR PRODUCING QUASI-NATURAL CHEESE FERMENTED FOODS

FIELD OF THE INVENTION

The present invention relates to a method for producing quasi-natural cheese fermented foods from soybean protein, and more particularly, from soybean milk.

BACKGROUND OF THE INVENTION

Heretofore, various methods for producing fermented foods analogous or similar to cheese from soybean milk have been proposed. However, it is difficult to obtain fermented foods which are comparable to cheese made from cow's milk having suitable properties including appropriate flavor, composition and touch. Such fermented foods are only analogous to natural foods, and the exploitation thereof has been limited to the trial stage and has not reached any practical level.

One reason that soybean milk has not been practically exploited is that it is different from cow's milk in its requirements for heating, lactic fermentation and curd preparation and it has a different compositional structure during ripening. For that reason, the product from soybean milk has been inferior to the existing cheese made from cow's milk in hardness, elasticity and flavor. In other words, a product produced from soybean milk has been inferior to a product made from cow's milk because the curds obtained from soybean milk have a much higher water content and a composition unsuitable for ripening and the soybean curds do not gently or smoothly ripen which results in insufficient brewing to produce the desired flavor. Therefore, considerable studies have been heretofore devoted to reducing the water content of the curds, the selection of ripening starters, the combination of lactic acid bacteria with other microorganisms, the method of ripening and flavor improvements, but these studies have for the most part failed to obtain sufficient flavor.

Low-temperature ripening has been previously attempted in order to improve the flavor. However, even though ripening was carried out in a low-temperature region for a prolonged period with the use of lactic acid bacteria alone for the preparation of quasi-cheese foods from soybean milk, the degree of ripening was so low that the resulting product was degraded in its physical properties, flavor and color tone. Thus, it has been difficult to obtain any edible quasi-cheese foods.

BRIEF DESCRIPTION OF THE DRAWING

FIG. 1 is a graphical view obtained by plotting the rate of decomposition of protein for the present product sample and for the conventional product sample against the ratio of water-soluble nitrogen with respect to the total nitrogen (e.g. protein solubility). The present product sample is prepared by ripening of the curds in the brewing material containing rice koji as the substrate. The conventional product sample is prepared with the use of lactic acid bacteria alone.

SUMMARY OF THE INVENTION

The present inventors have made intensive studies to establish new technology for making quasinatural cheese fermented foods which excel in digestibility and which are improved with respect to flavor, taste and composition. The inventors have taken into account the above-mentioned defects of the conventional techniques for the preparation of quasi-cheese fermented foods and they have pursued a new approach entirely free from the technical ideas generally accepted in the art. As a result, the present inventors have examined and studied the water retention of natural soybean protein and the brewing processes of miso (e.g., fermented soybean paste), soy sauce and sake produced under climatic conditions in Japan. More exactly, it has been found that in order to improve the flavor, taste and composition of curds obtained from soybean milk by lactic fermentation when making quasi-cheese foods therefrom, it is effective to form curds by lactic fermentation, fix the resulting curds and subject the thus fixed curds to fermentative ripening in a brewing material containing koji as the substrate(s) while cutting off the air supply. In other words, the contact with air is cut off during the process. Moreover, in this process of fermentative ripening, the enzymatic decomposition of the curd components by koji and the fermentative action of microorganisms by lactic acid bacteria and yeasts have a synergistic effect upon the promoted brewing of flavor and the gentle and smooth progress of curd ripening. During this process, the odor peculiar to soybean milk is removed, and the composition thereof is markedly improved, thus making the product smoother to touch. It has also been found that there is no need to use any special starter for ripening. In addition, efficient use may be made of a number of yeasts and microbial floras contained in the substrates of koji, of the yeasts of generally useful microorganisms, of lactic acid bacteria, i.e., salt-resistant yeasts such as *Tigosaccharomyces luxy* (Kagoshima Prefecture Yeast), of yeasts such as sake yeast (Brewing Association-of-Japan Yeast), and of salt-resistant lactic acid bacteria such as *Pediococcus halophilus*. Moreover, the composition of the brewing material containing koji as the substrate(s) may be varied by taking advantage of the various substrates thereof in order to brew a variety of flavors by way of biochemical decomposition and synthesis. Thus, it is possible to obtain quasi-natural cheese fermented foods which are nutritious foods excelling in their color tone, digestibility, and flavor while having an improved taste.

More specifically, the present invention provides a method for making quasi-natural cheese fermented foods from curds obtained by adding a lactic acid bacteria starter to soybean milk for fermentation. The process is characterized by fixing the curds by compacting, pressing and shaping the curds into a solid form, and ripening the fixed curds in a brewing material containing koji as the substrate(s), while cutting off contact of the curds with air, and making use of the fermentative action of enzymes and microorganisms contained in the koji.

DETAILED DESCRIPTION OF THE INVENTION

The present invention will now be described in further detail hereinbelow. Referring to the first process step, soybean milk obtained from soybeans in the conventional manner is subjected to lactic fermentation to obtain curds. The curds are then compacted, pressed and molded to a solid form for the purpose of fixing the curd structure. The compaction and fixation of the curds may be carried out according to conventional cheesemaking methods.

The curds that are the starting material for the process may be obtained in the following manner. Round soybeans are sorted out, well washed and fully swollen by immersion in water. The selected round soybeans are then triturated with the addition of water in order to obtain an amount of soybean milk that is about 8 to 10 times as much as the original amount of soybeans.

Subsequently, the soybean milk is heated to 90° C. under agitation, and it is immediately heat-treated at 105° to 115° C. for 3 to 5 minutes, thereby achieving sterilization simultaneously with sufficient denaturation of the soybean protein. By this heat treatment, the odor peculiar to soybeans is also removed. After removing the bean-curd refuse, the soybean milk is inoculated with heat-resistant lactic acid bacteria such as *Streptococcus thermophilus* or *Streptococcus lactis* for the purpose of fermentation and flocculation of the protein contained therein. It should be noted that in order to obtain curds of good quality, it is required to sterilize the sporulation bacteria which are present in the soybean milk taking into consideration the componential composition of the soybean milk, the deactivation of physiologically harmful substances and the creation of conditions suitable for flavoring. In particular, easy enzymatic decomposition of soybean protein due to thermal denaturation has a considerable influence upon the composition of curds and flavoring, as is the case for the raw material processing of brewed foods such as miso or soy sauce.

Hence, in order to facilitate the enzymatic decomposition of soybean protein, suitable conditions for sufficiently denaturing soluble flocculated matters are required for the heat treatment of soybean milk. To this end, the soybean milk is preferably heat-treated at a temperature of at least 105° C. for several minutes rather than at a temperature of 95° C. to 100° C. for several tens of minutes in order to improve the thermal denaturation and sterilization of the soybean protein. Thus, heating is desirably carried out at 105° C. to 115° C. for 3 to 5 minutes.

After the preparation of curds, the first step of the process of the present invention also involves cutting the curds, removal of whey, compaction, pressing, water washing, heating and coating of the curds for the purpose of fixing the structure of the curds substantially in accordance with conventional cheese-making methods. It should be noted that if the curds are compacted in a solidified state, then the next or second ripening process proceeds gently and smoothly, giving the products a fine flavor.

The preferred method for the fixation of the structure of the curds is to wash the solidified curds with water, and then coating the curds with a film composed of, for example, polyvinyl acetate or vinyl acetate. Alternatively, the curds may be combined with salt or with a 20% saline solution to regulate their salt content to about 4% to 8% for the same purpose. The addition of salt is convenient for the fermentative ripening of koji (e.g. malted rice, etc.) substrates in a brewing material in the second process step. Moreover, the addition of salt is effective in preventing the secondary contamination of the curds during fixation and in enhancing the integrity of the curds. If desired, the salt content may be regulated by slightly reducing the salt content of the brewing composition or by allowing the elution of salt from the curds. The conventional cheese products made of soybeans are disadvantageous in that they have a water content as high as 70% to 75%, and they are rapidly solubilized in water during the ripening process resulting in over-ripening. However, the degradation of the flavor may be avoided by increasing the salt content of the curds. The structure of curds may be fixed by drying and coating their surfaces, or the curds may be held at a temperature of about 20° C. to 30° C. for a short period of about one or two weeks without making any modification thereto. Curds of good quality may be obtained by this treatment and, at the same time, the second fermentative ripening process step may be carried out more smoothly.

The second step of the process according to the present invention involves fermentation of the curds in the brewing material containing koji as the substrate(s), which is to be carried out while cutting off the air supply. More specifically, the fixed curds are intimately mashed into the brewing material containing koji as the substrate(s). First, a temperature region of not higher than 30° C. and preferably not higher than 25° C. is applied to promote the decomposition of the koji substrate(s) and to create a yeast-growing environment by lactic fermentation on the basis of a pH drop and a titrated acidity. Moreover, the conditions suitable for flavoring are set up on the basis of a rate of sugar formation of 60% to 70%. Then, the products obtained by way of biochemical decomposition and synthesis and the fermentative action are allowed to act upon the curds at a temperature region of 20° C. to 15° C., thereby ensuring a gradual progress of curd ripening under regulated conditions.

The brewing material containing koji as the substrate(s) may be prepared by adding to the main koji material salt, water and useful microorganisms such as lactic acid bacteria and yeast. Moreover, seasonings such as pure or raw soy and a proteinous material or amino acid serving as a nitrogen source may be added and the materials are then uniformly mixed together. The salt and water contents are regulated to about 1–8% and about 40–60%, respectively.

By way of example, representative formulations of brewing materials containing koji as the substrate(s) are tabulated in Table 1.

TABLE 1

| Formulation Example | Raw Material | | | | | | (Remarks) | | |
|---|---|---|---|---|---|---|---|---|---|
| | Ratios of Koji Substrates | | | | | | | | |
| | rice/Malt Koji (Parts) | Soybeans Koji (Parts) | Water (Parts) | Salt (Parts) | Raw Soy Sauce (Parts) | Microorganisms | Water Content (%) | Salt Content (%) | Flavor Characteristics |
| 1 | 100 | — | 100 | 3 | — | Added | 61 | 1 | Alcohol and Good Taste |
| 2 | 100 | — | 60 | 9 | — | Added | 50 | 5 | Alcohol and Good Taste |
| 3 | 100 | — | — | 1 | 50 | Added | 40 | 6 | Good Taste |

TABLE 1-continued

| | Raw Material | | | | | | | |
|---|---|---|---|---|---|---|---|---|
| | Ratios of Koji Substrates | | | | | (Remarks) | | |
| Formulation Example | rice/ Malt Koji (Parts) | Soybeans Koji (Parts) | Water (Parts) | Salt (Parts) | Raw Soy Sauce (Parts) | Microorganisms | Water Content (%) | Salt Content (%) | Flavor Characteristics |
| 4 | 100 | 50 | 50 | 10 | 50 | Added | 50 | 7 | Good Taste and Salt |
| 5 | 100 | 100 | 80 | 25 | — | Added | 45 | 8 | Good Taste and Salt |

The koji may be an ordinary one made in three days for the purpose of brewing but, in particular, fresh koji is desired. The koji to be used may be malted rice (e.g. rice koji), malt (e.g. malt koji) and malted soybeans (e.g. soybean koji) generally used for miso (e.g., fermented soybean paste), soy sauce and sake. The microorganisms taking part in the fermentation and ripening together with the koji substrates include the microbial flora present in the koji. In addition, it is preferable and desirable for flavoring to use and add starter yeasts and lactic acid bacteria cultured and added for brewing. This offers an additional advantage that unique flavor is brewed depending upon the combination of the koji substrate(s) applied. Suitable microorganisms include those made of not only salt resistant yeasts and lactic acid bacteria for miso and soy sauce, but also yeasts for sake and shochu (e.g., low-class distilled spirits), which may be employed depending upon the composition of the substrates applied.

An environment advantageous for the symbiosis of yeasts and lactic acid bacteria in the koji substrates and the existence and growth of microorganisms in the brewing material also assures the conditions suitable for flavoring of the curds, and also assures that the fermentative ripening of the curds proceeds more easily and more smoothly to promote and to obtain a smooth structure of the curds. Through such a process, it is possible for the first time to make quasi-natural cheese fermented foodstuffs which are edible. Moreover, in this process, the curds are ripened, while decomposed, by the enzymes contained in koji, thereby brewing the desired physical properties, flavor and taste of quasi-cheese brewed foods.

Furthermore, it is important that the brewing material is intimately mashed into a vessel without any voids so as to allow it to be fermented in a uniform and a semi-anaerobic fashion. More effectively, the brewing material should be flattened on the surface, closely covered with a cloth or sheet, on which a pressing lid and a weight stone are placed. By this operation, it is possible to cut off the contact of the brewing material with air and, at the same time, to prevent any film yeast from occurring, thereby making the water content distribution uniform and promoting normal fermentation.

Moreover, the fermentative ripening of the curds and the degree of ripening of the curds are greatly affected by the rate of decomposition of koji by the salt and water contents of the brewing material containing the koji substrate(s) and by the temperature suitable for the growth of microorganisms. The temperature particularly affects the fermentative ripening and, accordingly, temperature control is of importance.

A lower temperature of 25° C. to 15° C., rather than a higher temperature of 30° C., is preferable for the flavor brewing of curds. However, depending upon the manner of ripening, the flavor of curds may be suitably brewed.

In an effort to further understand the effect of temperature on the flavor, the curds were ripened at temperature conditions ranging from about 30° C. to 35° C. As a result, it was found that the decomposition of the brewing material proceeded so excessively that it was colored and produced a browning odor with flavor degradation. Up to now, the ripening of cheese has been carried out at a temperature as low as 5° C. to 15° C. for a prolonged period to brew a mild but unique flavor, and low-temperature ripening has been considered to be desired in view of the generation of flavor. According to the present invention, however, the fermentative ripening of curds in the brewing material containing koji as the substrate(s) is preferably carried out in a relatively high temperature region of not higher than 30° C., preferably 15° C. to 25° C., at which no degradation of flavor takes place and which is suitable for the biochemical reaction and flavoring of curds in the koji substrate(s).

Usually, the suitable brewing time for the desired flavor is suitably within 2 to 3 months, although this time period varies with the temperature region applied and the form and size of the curds.

FIG. 1 is a graphical view obtained by plotting the rate of decomposition for protein in the present product sample and for the conventional product sample against the ratio of water-soluble nitrogen with respect to the total nitrogen (e.g. protein solubility). The present product sample is prepared by ripening of curds in the brewing material containing rice koji as the substrate. The conventional product sample is prepared with the use of lactic acid bacteria alone.

The product sample according to the present invention was prepared by placing curds in the brewing material obtained by adding salt, water and useful microorganisms, typically, salt-resistant yeast (e.g. *Tigosaccharomyces luxy* 55) and lactic acid bacteria (e.g. *Pediococcus halophilus* 20) and regulated to a salt content of about 6% and a water content of about 45% and ripening the curds at a fermentative ripening temperature of 25° C. for 15 days and then at 20° C. to 15° C. for 35 days or longer. On the other hand, the conventional product sample was prepared by ripening curds at 10° C. to 15° C. which were coagulated and shaped with the inoculation of lactic acid bacteria starters (e.g. *Streptococcus thermophilus* and *Streptococcus lactis*) alone. As noted from FIG. 1, the rate of decomposition of the protein in the present sample is higher than that in the conventional sample. Moreover, the difference between the present sample and the conventional sample becomes increasingly large over time. At the 30th day, about 30% of the total nitrogen is made water-soluble and, at the 40th day, higher than 40% of the total nitrogen is water-soluble. Flavor brewing starts to occur gradually from about the 10th or 15th days. In view of the degree of flavor brewing, it is unnecessary to achieve the rate of solubilization of protein exceeding 60%. In the process of fermentative ripening, the degree of ripening of the curds may also be found by the organoleptic estimation of the color tone, flavor, taste and composition of the curds.

In all cases, the ripening of curds in the brewing material containing koji as the substrate(s) provides a variety of preferable components by way of the enzymatic and microbial decomposition and synthesis, and produces products such as sugar, acids and alcohols as well as an ester flavor. The presence of such fermented components takes significant part in the development of a flavor peculiar to quasi-natural cheese fermented foods, and brings about satisfactory results. When rice koji and malt koji are used as the substrates, the ripened curds produce a soft flavor and taste combined with slight alcoholic and ester flavors. When soybean koji or rice koji plus raw soy sauce is used as the substrates, the ripened curds produce a flavor together with a strong taste.

According to the present invention, various flavors may be obtained by varying the composition of the brewing material containing koji as the substrate(s).

In what follows, the present invention will be explained with reference to several non-restrictive Examples.

EXAMPLE 1

One (1) Kg of round soybeans was well washed and immersed in water. The thus swelled soybeans (e.g. having a water content of 60.2%) were triturated with water that was finally added in an amount of 9 times, heat-treated at about 110° C. for 3 minutes, and thereafter filtered through an 80-mesh cloth to obtain 9 liters of soybean milk having a solid content of 7.2%. After cooling to about 35° C. to 40° C., 300 ml of a liquid obtained by mixing equal amounts of precultured (e.g., in a soybean milk medium) lactic acid bacteria starters *Streptococcus thermophilus* and *Streptococcus lactis* were added to the soybean milk, which was then held at a temperature of about 30° C. to 40° C. for 3 to 4 hours for coagulation. During coagulation, the soybean milk had a pH of between 5.4 and 5.6. Over 20 to 30 minutes, the temperature of the coagulated product was increased to about 50° C., and the curds that were formed were then cut according to the conventional manner, followed by the removal of whey. The thus obtained curds were transferred into a cylindrical frame of about 300 cc in volume, and a weight of about 20 Kg to 30 Kg was placed thereon for 10 hours or longer for the purpose of pressing. The thus pressed product was salted in a 20% saline solution overnight to obtain a curd product having a salt content of 5.6%. After surface-drying, the curd product was coated with a vinyl acetate film, and was held in a temperature region of about 20° C. to 23° C. over 12 days to fix the structure thereof. Three elastic pieces in the oval form, each of about 250 g in weight, were obtained from the thus processed curd product.

Subsequently, the three fixed curd pieces were transferred to the step of fermentative ripening to be carried out in a brewing material containing rice koji as the substrate. One (1) Kg of the brewing material used was prepared by uniformly mixing together 100 parts of rice koji, 60 parts of water, 9 parts of salt and a small amount of the culture starter according to the proportion of Formulation Example 2 shown in Table 1. The rice koji used was obtained by three (3)-day koji-making for miso, had a pH value of 5.86 and a water content of 25.4% and included neutral protease (e.g. pH 6.0) having a titer of 106. The culture starter was salt-resistant yeast *Tigosacharomyces luxy* 55, and was added in a concentration of $5 \times 10^5$/g. The thus prepared brewing material had a water content of 50.2%, a salt content of 5.4% and a pH value of 5.78.

The fixed curd product was closely mashed into a vessel without any voids, while it was wrapped up with the brewing material. The curd product was then flattened on the surface thereof and covered thereon with a sheet, on which a pressing lid was placed. The vessel was first held at a temperature of 25° C. for 15 days for brewing on the basis of pH 5.2, a titrated acidity of 5.0 or higher and a sugar formation rate of 60% or higher, while promoting the decomposition of the koji substrate. Subsequently, fermentative ripening was respectively continued in the temperature regions of 20° C. and 15° C. for 20 days. The ripened brewed material showed 46.2% of water-soluble nitrogen with respect to the total nitrogen (e.g. protein solubility), and gave a taste based on amino acid and a pleasant alcoholic flavor. Further, the structure of the brewed material was soft and smooth, and assumed a light yellow white color.

The present product was subjected to a simple organoleptic test and ranked by a panel constituted by six male experts and six female experts who were engaged in research and development. The results of the five-rank estimation are set forth in Table 2.

TABLE 2

| Panel Members | Number | Estimation Rank (Flavor) | | | | |
| --- | --- | --- | --- | --- | --- | --- |
| | | Very Good | Slightly Good | Good | Slightly Bad | Bad |
| Male | 6 Estimation | 2 Smoothness Deliciousness Flavor | 3 Smoothness Deliciousness | 1 Flavor Alcoholic flavor | — | — |
| Female | 6 Estimation | — | 3 Deliciousness smoothness | 2 Deliciousness Alcoholic flavor | 1 Flavor Alcoholic flavor | — |
| Answer (%) | | 16.7 | 50 | 25 | 8.3 | |

As a result of the organoleptic test, most of the panel members pointed out that the present product had a soft structure, and was of great deliciousness which was mingled with slight alcoholic and ester flavors. However, they did not indicate that the product had a bitter taste or gave out an odor peculiar to soybeans. As appreciated from these results, the quasi-natural cheese fermented food product according to the present invention is smooth and unique, has a mild and preferable flavor which is not found in conventional quasi-cheese protein foods, and is suitable for the popular taste.

EXAMPLE 2

One (1) Kg of a brewing material was prepared by mixing well together 1000 parts of a malt koji, 50 parts of soybean koji, 50 parts of water, 10 parts of salt, 50 parts of raw soy sauce and a small amount of the culture starter according to the proportion of Formulation Example 4 in Table 1. This material had a water content of 51.6%, a salt content of 7.1% and a pH value of 5.3. The koji used was prepared by 3-day koji-making. The malt koji had a water content of 28.6% and a pH value of 5.56 and included neutral protease (e.g. pH 6.0) having a titer of 190, while the soybean koji had a water content of 31.4% and a pH value of 6.52 and included neutral protease (e.g. pH 7.0) having a titer of 32. The raw soy sauce had a total nitrogen content of 1.84, a saline content of 16.0% and a pH value of 4.80. The culture starter included salt-resistant yeast and lactic acid bacteria (e.g. *Pediococcus halophilus*) added in the respective concentrations of $2\times10^5$/g and $2\times10^5$/g. Example 1 was repeated except that the aforesaid formulation was used as the brewing material containing koji as the substrate, and the ripening of curds was carried out at 25° C. for 10 days, at 20° C. for 25 days and then at 15° C. for 20 days. As a result, the ripened curds showed a protein solubility of 56.2%.

The present product excelled in flavor, assumed a yellow-brown color in appearance, was of stronger deliciousness based on amino acid, and had a smooth structure.

EXAMPLE 3

One (1) Kg of a brewing material containing rice koji and soy sauce koji as the substrates was prepared by uniformly mixing together 100 parts of rice koji, 100 parts of soy sauce koji, 90 parts of water and 25 parts of salt. This material had a water content of 47.5%, a salt content of 7.5% and a pH value of 5.4.

Example 1 was repeated except that the aforesaid formulation was used as the brewing material containing koji as the substrates, and the ripening of the curds was carried out at 25° to 28° C. for 30 days, at 20° to 25° C. for 30 days and then at 20° to 15° C. for 30 days. As a result, the ripened curds showed a protein solubility of 56.6%.

The present product excelled in flavor, had a soft and smooth structure, assumed a light yellow-brown color in appearance, and was of deliciousness based on amino acid.

EXAMPLE 4

A brewing material containing malt koji as the substrate was prepared by mixing together 100 parts of malt koji, 100 parts of water, 4 parts of salt and a small amount of a culture yeast liquid.

The culture yeast containing $5\times10^6$/g of yeast was obtained by the purification and separation of shochu moromi or mash. The brewing material had a water content of 60.6%, a salt content of 1.8% and a pH value of 5.3%.

Example 3 was repeated except that the aforesaid formulation was used as the brewing material containing koji as the substrate, and the ripening of curds was continued for 70 days. As a result, the ripened curds showed a protein solubility of 42.8%.

The present product assumed a yellow-brown color in appearance, and was characterized in that its flavor was mingled with alcoholic and ester flavors along with an acid taste.

EXAMPLE 5

One (1) Kg of a brewing material containing soy sauce koji as the substrate was prepared by mixing well together 100 parts of soy sauce koji, 100 parts of water, 4 parts of salt and a small amount of culture yeast. This material had a water content of 57.6%, a salt content of 6.4% and a pH value of 5.6.

Example 1 was repeated except that the aforesaid formulation was used as the brewing material containing koji as the substrate, and the ripening of curds was continued for 90 days. As a result, the ripened curds showed a protein solubility of 57.4%.

The present product assumed an intense yellow-brown color in appearance, and was very delicious.

The ripened curds obtained in Examples 2-5 were evaluated with the organoleptic test as mentioned in Example 1. The results are set forth in Table 3.

TABLE 3

| Ripened Curds | Estimation Answer (%) | | | | |
|---|---|---|---|---|---|
| | Very Good | Slightly Good | Good | Slightly Bad | Bad |
| Ex. 2 | 25 | 50 | 25 | 0 | 0 |
| Ex. 3 | 25 | 50 | 25 | 0 | 0 |
| Ex. 4 | 16.6 | 50 | 16.7 | 16.7 | 0 |
| Ex. 5 | 17.7 | 50 | 33.3 | 0 | 0 |

As noted from these results, the substantially same estimation as in Example 1 was made. However, with respect to the ripened curd product of Example 4, there was a difference in taste between the male and female panel members. Moreover, the quasi-natural cheese foods made from the ripened curds are found to be of a characteristic flavor depending upon the nature of the koji substrates used.

As mentioned in the foregoing, the ripening of curds is carried out in the brewing material containing koji as the substrate(s) under the semi-anaerobic conditions where the contact thereof with air is cut off. Thus, unlike conventional quasi-cheese foods, the resulting product takes on a light and satisfactory appearance, and assumes a soft, smooth and preferable flavor without giving out a fatty odor peculiar to soybeans and assuming a gray color over time.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for making a quasi-natural cheese fermented food from curds obtained by the lactic fermentation of soybean milk, comprising the steps of:
    shaping said curds to a solid form by compacting and pressing to fix said curds, and subjecting said fixed curds to fermentative ripening in a brewing material containing at least one type of koji as the substrate and adding at least one microorganism selected from the group consisting of lactic acid bacteria, yeast and combinations thereof, said fermentative ripening occurring under semi-anaerobic conditions wherein contact of the curds with air is cut off.

2. The method as defined in claim 1, wherein said koji substrate in said brewing material is selected from the group consisting of rice koji, malt koji, soybean koji, and combinations thereof.

3. The method as defined in claim 1, wherein said lactic acid bacteria and yeast added to said brewing material containing koji as the substrate are selected from the group consisting of salt-resistant yeast, salt-resistant lactic acid bacteria and combinations thereof.

4. The method as defined in claim 1, wherein said ripening is first carried out at a temperature not higher than 30° C., then at a temperature of about 20° C. to 15° C.

5. The method as defined in claim 1, wherein raw soy sauce is added to said brewing material containing koji as the substrate.

6. The method as defined in claim 3, wherein the salt-resistant yeast is selected from the group consisting of *Tigosaccharomyces luxy*, shochu yeast, sake yeast, and mixtures thereof; and the salt-resistant lactic acid bacteria is *Pediococchus halophilus*.

7. The method as defined in claim 1, wherein the brewing materials contain about 1–8% salt and about 40–60% water.

8. The method as defined in claim 1, wherein during shaping and fixing the curds are coated with a film, combined with salt or combined with a 20% saline solution to regulate salt content.

9. The method as defined in claim 1, wherein prior to the fixing of the curds, the process further comprises deodorizing, sterilizing and denaturizing soybean milk by heating to 90° C. under agitation and then heat treating at 105° to 115° C. for 3 to 5 minutes.

10. The method as n claim 1, wherein prior to the fixing of the curds, the process further comprises sterilizing sporulation bacteria present in soybean milk.

11. The method as defined in claim 1, wherein prior to the fixing of the curds, the process further comprises heating soybean milk at 105° C. to 115° C. for 3 to 5 minutes.

12. The method as defined in claim 1, wherein the rate of sugar formation during the fermentative ripening is 60 to 70%.

13. A method for making a quasi-natural cheese fermented food, comprising the steps of:
fixing curds obtained by lactic fermentation of soybean milk to a solid form by compacting and pressing; and
fermentative ripening said curds in a brewing material containing at least one type of koji as the substrate and adding at least one microorganism selected from the group consisting of lactic acid bacteria, yeast and combinations thereof, said fermentative ripening occurring under semi-anaerobic conditions wherein contact of the curds with air is cut off, said brewing material containing about 1–8% salt and about 40–60% water.

* * * * *